United States Patent
Flores et al.

(10) Patent No.: US 9,090,759 B2
(45) Date of Patent: Jul. 28, 2015

(54) HIGH REFLECTANCE POLYCARBONATE

(71) Applicant: SABIC Global Technologies B.V., Bergen op Zoom (NL)

(72) Inventors: Amanda Marie Flores, Mount Vernon, IN (US); Vandita Pai-Paranjape, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 13/765,204

(22) Filed: Feb. 12, 2013

(65) Prior Publication Data
US 2013/0265771 A1 Oct. 10, 2013

Related U.S. Application Data

(60) Provisional application No. 61/620,808, filed on Apr. 5, 2012, provisional application No. 61/636,824, filed on Apr. 23, 2012.

(51) Int. Cl.
*C08L 69/00* (2006.01)
*C08K 3/22* (2006.01)
(Continued)

(52) U.S. Cl.
CPC ... *C08K 5/42* (2013.01); *C08K 3/22* (2013.01); *C08K 5/3447* (2013.01); *C08K 5/3475* (2013.01); *C08K 5/357* (2013.01); *C08K 9/02* (2013.01); *C08K 9/08* (2013.01);
(Continued)

(58) Field of Classification Search
CPC .............. C08K 3/22; C08L 69/00; F21V 7/22
See application file for complete search history.

(56) References Cited

U.S. PATENT DOCUMENTS 5,502,153 A   3/1996   Sakashita et al.
5,530,062 A   6/1996   Bradtke et al.
(Continued)

FOREIGN PATENT DOCUMENTS

EP   0524731 A1   1/1993
EP   1555296 A1   7/2005
(Continued)

OTHER PUBLICATIONS

Ishihara Sangyo KK (Titanium Dioxide Products: WHITE Pigments, Ishihara Sangyo KK, 2012, 7 pages).*
(Continued)

*Primary Examiner* — Brieann R Fink
(74) *Attorney, Agent, or Firm* — Cantor Colburn LLP

(57) ABSTRACT

In an embodiment, a polycarbonate composition comprises: polycarbonate; 7 wt % to 20 wt % titanium dioxide, based upon a total weight of the polycarbonate composition; an optional flame retardant; and an optional UV stabilizer. A plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm. In an embodiment, a polycarbonate composition comprises: a polycarbonate; 7 to 20 wt % titanium dioxide; a flame retardant; and an optional UV stabilizer; wherein the polycarbonate composition has a maximum reflectance of greater than or equal to 95%. The melt volume rate as determined at 300° C. using a 1.2 kilogram weight, in accordance with ASTM D1238-04 is from 5 to 30 grams per 10 minutes.

30 Claims, 5 Drawing Sheets

LED

(51) Int. Cl.
*F21V 7/22* (2006.01)
*C08K 5/42* (2006.01)
*C08K 5/3447* (2006.01)
*C08K 5/357* (2006.01)
*C08K 5/3475* (2006.01)
*C08K 9/02* (2006.01)
*C08K 9/08* (2006.01)
*F21V 29/00* (2015.01)
*F21Y 101/02* (2006.01)

(52) U.S. Cl.
CPC . *F21V 7/22* (2013.01); *F21V 29/20* (2013.01); *F21Y 2101/02* (2013.01)

(56) References Cited

U.S. PATENT DOCUMENTS

| | | | |
|---|---|---|---|
| 5,837,757 | A * | 11/1998 | Nodera et al. ................. 524/87 |
| 6,355,946 | B1 * | 3/2002 | Ishinaga ......................... 257/98 |
| 6,664,313 | B2 * | 12/2003 | Hirai et al. .................... 523/209 |
| 7,148,313 | B2 | 12/2006 | Koga et al. |
| 7,939,591 | B2 * | 5/2011 | Tomoda ......................... 524/284 |
| 2002/0115762 | A1 | 8/2002 | Chung et al. |
| 2005/0209434 | A1 | 9/2005 | Abad et al. |
| 2005/0261414 | A1 * | 11/2005 | Mitsuhashi et al. .......... 524/451 |
| 2005/0272857 | A1 * | 12/2005 | Kawato et al. ................ 524/497 |
| 2006/0047037 | A1 * | 3/2006 | Kawato et al. ................ 524/268 |
| 2006/0159926 | A1 * | 7/2006 | Funaki et al. ................. 428/412 |
| 2007/0054110 | A1 * | 3/2007 | Kawato et al. .............. 428/318.4 |
| 2007/0299169 | A1 * | 12/2007 | Ohira et al. ................... 524/100 |
| 2008/0132614 | A1 * | 6/2008 | Jung et al. .................... 524/100 |
| 2009/0118406 | A1 | 5/2009 | Tomoda |
| 2012/0131835 | A1 | 5/2012 | Barrett et al. |
| 2012/0248102 | A1 | 10/2012 | van de Wetering et al. |
| 2013/0265771 | A1 | 10/2013 | Flores et al. |
| 2013/0274391 | A1 * | 10/2013 | An et al. ....................... 524/165 |

FOREIGN PATENT DOCUMENTS

| | | |
|---|---|---|
| JP | 2012131835 A | 7/2012 |
| WO | 0055249 A1 | 9/2000 |

OTHER PUBLICATIONS

Ishihara Sangyo KK-2 (Titanium Dioxide Products: WHITE Pigments, Ishihara Sangyo KK, 2012, 7 pages).*
Cytec (Cyasorb UV-5411 Product Safety Summary. Cytec. Dec. 2012, 5 pages).*
Japanese Patent No. 2012131835 (A); Publication Date: Jul. 12, 2012; Machine Translation from the Japanese Patent Office; 13 Pages.
DuPont T-Pure—Titanium Dioxide; Polymers, Light and the Science of TiO2; Copyright 2007; 20 Pages.
DE 19503470 A1; Date of Publication Aug. 8, 1996; 2 pages; English Abstract.
International Search Report for International Application No. PCT/US2013/035456; International Filing Date Apr. 5, 2013; Date of Mailing Jun. 27, 2013; 5 pages.
Written Opinion of the International Search Report for International Application No. PCT/US2013/035456; International Filing Date Apr. 5, 2013; Date of Mailing Jun. 27, 2013; 8 pages.
Yamada et al.; Sequential-color LCD based on OCB with an LED backlight; Journal of the SID; 10/1; 2002; 5 pages.
Nowakowska et al.; "Studies of Some Impurities in Commercial Bisphenols-A"; Polish Journal of Applied Chemistry; Panstwowy Zaklad Wydawnictw Lekarskich; 1996; 9 pages.

* cited by examiner

HIGH REFLECTANCE POLYCARBONATE

CROSS REFERENCE TO RELATED APPLICATIONS

The present application claims priority to U.S. Provisional Application Ser. No. 61/620,808, filed Apr. 5, 2012 and U.S. Provisional Application Ser. No. 61/636,824, filed Apr. 23, 2012, the contents of which are incorporated herein by reference.

BACKGROUND

Due to changes in regulations mandating more efficient lighting and the planned phase-out of incandescent bulbs by many countries, new light sources like compact fluorescent lamps (CFLs) and light emitting diodes (LEDs) are becoming increasingly popular with consumers. Not only are these light sources more efficient, but the expected lifetime is also higher, where incandescent bulbs can have a lifetime of up to 1,500 hours (h), CFLs up to 15,000 hours, and LEDs up to 50,000 hours.

Reflectors can be used in lighting components to mix and diffuse light emitted from a light source and reflect it back towards the desired environment. This approach reduces glare and provides better aesthetics as compared to light that is directly emitted from shallowly recessed lights. Reflectors are typically made of metal and are coated with a film that has high reflectivity and low gloss for better mixing of light.

Due to their mechanical properties, polycarbonates are desirable for use as reflectors, but are inherently not very reflective. Thus, there remains a need in the art for polycarbonates with improved light reflectivity.

SUMMARY

Disclosed herein are polycarbonate compositions, articles comprising the same, and methods of using the same.

In an embodiment, a polycarbonate composition comprises: polycarbonate; 7 weight percent (wt %) to 20 wt % titanium dioxide, based upon a total weight of the polycarbonate composition; an optional flame retardant; and an optional UV stabilizer. A plaque formed from the polycarbonate composition has a reflectance of greater than or equal to 95%, as determined by reflectance measurements using a Gretag Macbeth Coloreye spectrophotometer (D65 light source, 10 degree observer, UV included) at intervals of 10 nanometers (nm) from 360 to 750 nm, e.g., measured on a 3.2 millimeter (mm) thick plaque. The value was the highest reflectivity value from the 650 nm to 700 nm wavelength range.

In an embodiment, a polycarbonate composition comprises: a polycarbonate; 7 wt % to 20 wt % titanium dioxide; a flame retardant; and an optional UV stabilizer; wherein the polycarbonate composition has a maximum reflectance of greater than or equal to 95%. The melt volume rate as determined at 300 degrees Celsius (° C.) using a 1.2 kilogram (kg) weight, in accordance with ASTM D1238-04 is from 5 to 30 grams per 10 minutes (g/10 min).

A method of making a polycarbonate composition comprising: combining polycarbonate with 7 wt % to 20 wt % titanium dioxide to form a polycarbonate composition, wherein the weight percentage is based upon a total weight of the polycarbonate composition; and pelletizing the composition to form pellets. A molded plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm.

These and other non-limiting characteristics are more particularly described below.

BRIEF DESCRIPTION OF THE DRAWINGS

For a more complete understanding of the present application, reference is now made to the following descriptions taken in conjunction with the accompanying figures in which.

DETAILED DESCRIPTION

Figure 1:
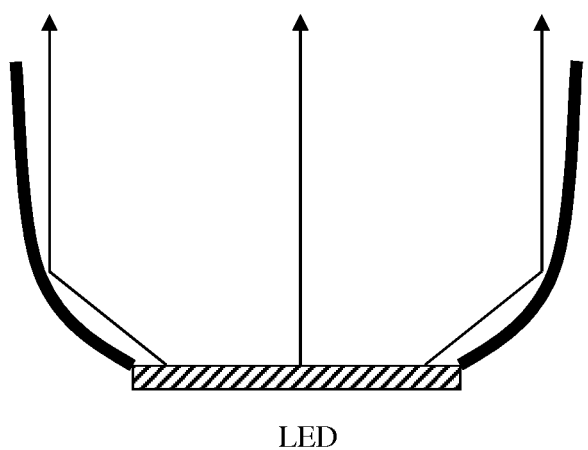
FIG. 1 is an illustration of a troffer; e.g., a reflector for use with a light emitting element such as an LED.

Reflectors are typically made of metal and are coated with a film that has high reflectivity to attain their desired reflectance. Attempts at developing high reflectance polycarbonates have been made by incorporating high levels of titanium dioxide into polycarbonate compositions. However, there is still room for improvements of such high reflectivity polycarbonate compositions for increased reflectivity, thermal stability, color, and flame retardancy.

This disclosure focuses on high reflectance thermoplastic compositions. The high reflectance is achieved by incorporating a reflective agent, such as titanium dioxide, into a thermoplastic composition in an amount of between 7 and 20 wt % as it was unexpectedly discovered that 20 wt % or more of the reflective agent resulted in a decrease in the reflectivity of the polycarbonate compositions. The thermoplastic composition can further display one or more of improved color retention, flame retardancy, and thermal resistance. Reflectors comprising the present composition can be free of metallization while attaining the desired reflectance.

Polycarbonate

A "polycarbonate" means compositions having repeating structural carbonate units of formula (1)

(1)

in which at least 60% of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

HO-$A^1$-$Y^1$-$A^2$-OH (2)

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a dihydroxy aromatic compound of formula (3)

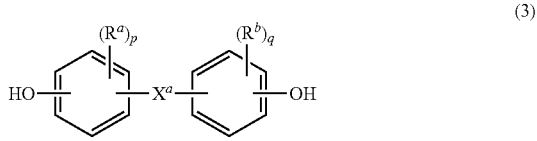

(3)

wherein $R^a$ and $R^b$ are each independently a halogen or $C_{1-12}$ alkyl group; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^e$)($R^d$)— wherein $R^e$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

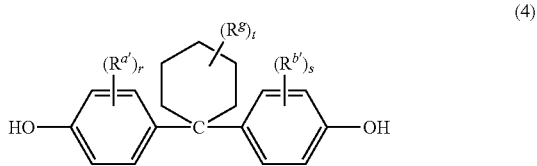

(4)

wherein $R^{a'}$ and $R^{b'}$, are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'\, and\, Rb'}$ are each independently $C_{1-4}$ alkyl, $R^g$ is $C_{1-4}$ alkyl, r and s are each 1, and t is 0 to 5. In another specific embodiment, $R^{a'}$, $R^{b'}$, and $R^g$ are each methyl, r and s are each 1, and t is 0 or 3. The cyclohexylidene-bridged bisphenol can be the reaction product of two moles (mol) of o-cresol with one mole of cyclohexanone. In another embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-8}$ cycloalkylidene of formula (5)

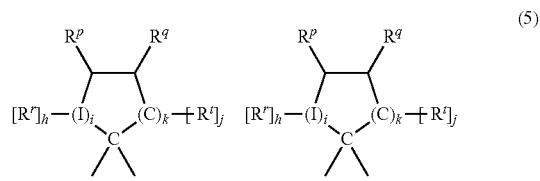

(5)

wherein $R^r$, $R^p$, $R^q$, and $R^t$ are each independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1- bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis (4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dL/g), specifically 0.45 to 1.0 dL/g. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 mL per minute.

In an embodiment, the polycarbonate has flow properties useful for the manufacture of thin articles. Melt volume flow rate (often abbreviated MVR) measures the rate of extrusion of a thermoplastic through an orifice at a prescribed temperature and load. Polycarbonates useful for the formation of thin articles can have an MVR, measured at 300° C./1.2 kg, of 5 to 30 grams per 10 minutes (g/10 min), specifically 10 to 25 g/10 min. Adjusting the molecular weight of the polycarbonates or using combinations of polycarbonates of different flow properties can be used to achieve the overall desired flow property.

"Polycarbonates" include homopolycarbonates (wherein each $R^1$ in the polymer is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

A specific type of copolymer is a polyester carbonate, also known as a polyester-polycarbonate. Such copolymers further contain, in addition to recurring carbonate chain units of formula (1), repeating units of formula (7)

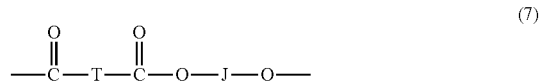

(7)

wherein J is a divalent group derived from a dihydroxy compound, and can be, for example, a $C_{2-10}$ alkylene, a $C_{6-20}$ cycloalkylene, a $C_{6-20}$ arylene, or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear.

In an embodiment, J is a $C_{2-30}$ alkylene group having a straight chain, branched chain, or cyclic (including polycyclic) structure. In another embodiment, J is derived from an aromatic dihydroxy compound of formula (3) above. In another embodiment, J is derived from an aromatic dihydroxy compound of formula (4) above. In another embodiment, J is derived from an aromatic dihydroxy compound of formula (6) above.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate is derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

Polycarbonates can be manufactured by processes such as interfacial polymerization and melt polymerization. Although the reaction conditions for interfacial polymerization can vary, a process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a BANBURY* mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing esters. In addition, useful transesterification catalysts can include phase transfer catalysts of formula $(R^3)_4Q^+X$, wherein each $R^3$, Q, and X are as defined above.

Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polyester-polycarbonates can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example, instead of using isophthalic acid, terephthalic acid, or a combination comprising at least one of the foregoing acids, isophthaloyl dichloride, terephthaloyl dichloride, or a combination comprising at least one of the foregoing dichlorides can be used.

In addition to the polycarbonates described above, combinations of the polycarbonate with other thermoplastic polymers, for example combinations of homopolycarbonates and/or polycarbonate copolymers with polyesters, can be used. Useful polyesters can include, for example, polyesters having repeating units of formula (7), which include poly(alkylene dicarboxylates), liquid crystalline polyesters, and polyester copolymers. The polyesters described herein are generally completely miscible with the polycarbonates when blended.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester, depending on the ultimate end use of the composition.

Useful polyesters can include aromatic polyesters, poly(alkylene esters) including poly(alkylene arylates), and poly(cycloalkylene diesters). Aromatic polyesters can have a polyester structure according to formula (7), wherein J and T are each aromatic groups as described hereinabove. In an embodiment, useful aromatic polyesters can include, for example, poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)]ester, or a combination comprising at least one of these. Also contemplated are aromatic polyesters with a minor amount, e.g., 0.5 to 10 wt %, based on the total weight of the polyester, of units derived from an aliphatic diacid and/or an aliphatic polyol to make copolyesters. Poly(alkylene arylates) can have a polyester structure according to formula (7), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups J include, for example, ethylene, 1,4-butylene, and bis-(alkylene-disubstituted cyclohexane) including cis- and/or trans-1,4-(cyclohexylene)dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A specifically useful poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be useful. Specifically useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (8)

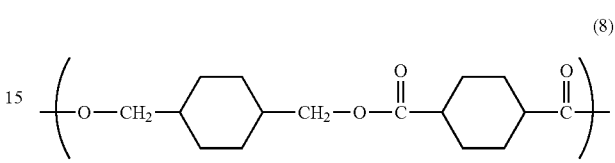

wherein, as described using formula (7), J is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polycarbonate and polyester can be used in a weight ratio of 1:99 to 99:1, specifically 10:90 to 90:10, and more specifically 30:70 to 70:30, depending on the function and properties desired.

It is desirable for such a polyester and polycarbonate blend to have an MVR of 5 to 150 cc/10 min., specifically 7 to 125 cc/10 min, more specifically 9 to 110 cc/10 min, and still more specifically 10 to 100 cc/10 min., measured at 300° C. and a load of 1.2 kilograms according to ASTM D1238-04.

The composition can further comprise a polysiloxane-polycarbonate copolymer, also referred to as a polysiloxane-polycarbonate. The polydiorganosiloxane (also referred to herein as "polysiloxane") blocks of the copolymer comprise repeating diorganosiloxane units as in formula (9)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ aralkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (9) can vary widely depending on the type and relative amount of each component in the polycarbonate composition, the desired properties of the composition, and like considerations. Generally, E has an average value of 2 to 1,000, specifically 2 to 500, or 2 to 200, more specifically 5 to 100. In an embodiment, E has an average value of 10 to 75, and in still another embodiment, E has an average value of 40 to 60. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

A combination of a first and a second (or more) polycarbonate-polysiloxane copolymers can be used, wherein the average value of E of the first copolymer is less than the average value of E of the second copolymer.

In an embodiment, the polydiorganosiloxane blocks are of formula (10)

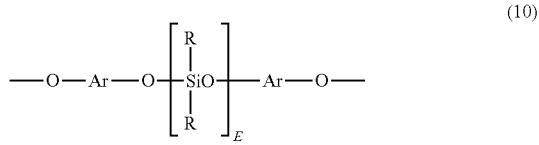

(10)

wherein E is as defined above; each R can be the same or different, and is as defined above; and Ar can be the same or different, and is a substituted or unsubstituted $C_6$-$C_{30}$ arylene group, wherein the bonds are directly connected to an aromatic moiety. Ar groups in formula (10) can be derived from a $C_6$-$C_{30}$ dihydroxyarylene compound, for example a dihydroxyarylene compound of formula (3) or (6) above. Dihydroxyarylene compounds are 1,1-bis(4-hydroxyphenyl) methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

In another embodiment, polydiorganosiloxane blocks are of formula (11)

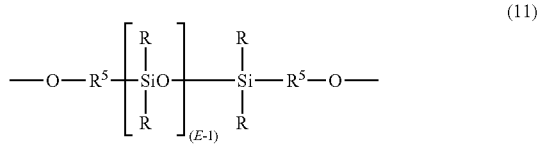

(11)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the polydiorganosiloxane blocks are of formula (12):

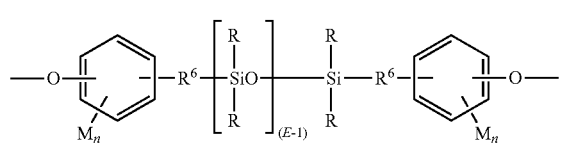

(12)

wherein R and E are as defined above. $R^6$ in formula (12) is a divalent $C_2$-$C_8$ aliphatic group. Each M in formula (12) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

Blocks of formula (12) can be derived from the corresponding dihydroxy polydiorganosiloxane (13)

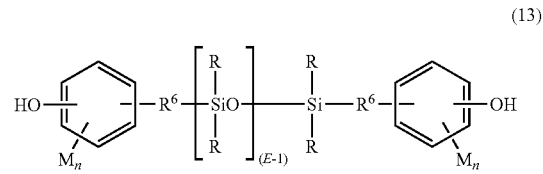

(13)

wherein R, E, M, $R^6$, and n are as described above. Such dihydroxy polysiloxanes can be made by effecting a platinum-catalyzed addition between a siloxane hydride of formula (14)

(14)

wherein R and E are as previously defined, and an aliphatically unsaturated monohydric phenol. Aliphatically unsaturated monohydric phenols include eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing can also be used.

The polyorganosiloxane-polycarbonate can comprise 50 to 99 wt % of carbonate units and 1 to 50 wt % siloxane units. Within this range, the polyorganosiloxane-polycarbonate copolymer can comprise 70 to 98 wt %, more specifically 75 to 97 wt % of carbonate units and 2 to 30 wt %, more specifically 3 to 25 wt % siloxane units.

Polyorganosiloxane-polycarbonates can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polyorganosiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polyorganosiloxane-polycarbonates of different flow properties can be used to achieve the overall desired flow property.

Reflective Agent

The polycarbonate composition comprises reflective agent (s) with a high refractive index such as titanium dioxide or zinc oxide, wherein a high refractive index is greater than 1.7. Desirably, the refractive index is greater than or equal to 2. Possible reflective agents include titanium dioxide (such as rutile and anatase), zinc oxide, zinc sulfide, antimony oxide, and combinations comprising at least one of the foregoing.

The reflective agent can be treated with inorganic treatments such as one or more of hydrated alumina, silicon dioxide, sodium silicates, sodium aluminates, sodium aluminum silicates, zinc oxide, zirconium oxide, and mica. These treatments can act as building blocks in the construction of the reflective (e.g., titanium dioxide) particle and can be selectively precipitated such that they occur close to the surface in the individual particles. These treatments can be used as dispersing aids and/or neutralizing agents.

The reflective agent can be uncoated or coated, wherein the coating can be layered with one or more coating layers. Suitable coating agents for the reflective agent can include one or more of silane coupling agents including alkyl alkoxysilane and polyorgano hydrogen siloxane; silicone oil; alkyl hydrogen polysiloxanes; polyorganosiloxanes; alcohols including trimethylolpropanol; polyols including trimethylol propane; alkyl phosphates; phosphorylated fatty acids; higher fatty acid ester; acid compounds such as phosphorus acid, phosphoric acid, carboxylic acid, and carboxylic anhydride; wax; and other coating agents. Specialized coatings such as titanate coupling agents including isopropyl triisostearoyl titanate can be incorporated. The reflective agent can have a metal coating such that the reflective agent either bonds with the polycarbonate or has little to no interaction with the polycarbonate. Possible metals include aluminum, titanium, boron, and so forth. Some examples of coatings include silicon dioxide; a metal oxide (such as aluminum oxide); and a metal nitride (such as boron nitride, silicon nitride, and titanium nitride); as well as combinations comprising at least one of the foregoing. Generally, the reflective agent and the coating have different compositions. For example, the reflective agent can be a coated titanium dioxide. Possible coatings include inorganic (e.g. alumina) and/or organic coatings (e.g. polysiloxane), where the inorganic coating can comprise 0 to 5 wt % silica or alumina and the organic coating can comprise 0 to 3 wt % of an hydrophobic organic surfactant. Hence, the reflective agent can be alumina coated titanium dioxide, alumina and polysiloxane coated titanium dioxide, and/or polysiloxane coated titanium dioxide. For example, the reflective agent is a titanium dioxide having an R2 classification pursuant to DIN EN ISO 591, Part 1, that is stabilized with compound(s) of aluminum and/or silicon, and has a titanium dioxide purity of greater than or equal to 96.0%. An example of a titanium dioxide is Kronos 2233, commercially available from Kronos Worldwide, Inc.

The reflective agent, e.g., titanium dioxide, can be coated or uncoated, and can have an average particle size of less than 500 nm, specifically, 30 nm to 500 nm, specifically, 50 nm and 500 nm, more specifically, 170 nm to 350 nm, yet more specifically, 100 nm to 250 nm, and even 150 nm to 200 nm. For example, the reflective agent, e.g., titanium dioxide, can have an average particle size of greater than or equal to 30 nm, specifically, less than or equal to 180 nm, e.g., 30 nm to 180 nm. The average particle size can be greater than or equal to 170 nm as smaller particle sizes can appear to be more blue, which may result in a lower reflectivity.

In an embodiment the reflective agent is a titanium dioxide having an R2 classification pursuant to DIN EN ISO 591, Part 1, that is stabilized with compound(s) of aluminum and/or silicon, has a titanium dioxide purity of greater than or equal to 96.0%.

An example of a suitable titanium dioxide is Kronos 2233, commercially available from Kronos Worldwide, Inc.

The reflective agent can be present in an amount of 7 wt % to 40 wt %, specifically, 7 wt % to 25 wt %, more specifically 10 wt % to 20 wt %, and even more specifically 12.5 to 15 wt %, based upon the total weight of the polycarbonate composition.

Flame Retardants

The polycarbonate composition can further comprise a flame retardant. Useful flame retardants include organic compounds that include phosphorus, bromine, and/or chlorine. Non-brominated and non-chlorinated phosphorus-containing flame retardants are desirable in certain applications for regulatory reasons, for example organic phosphates and organic compounds containing phosphorus-nitrogen bonds.

One type of organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Aromatic phosphates include, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

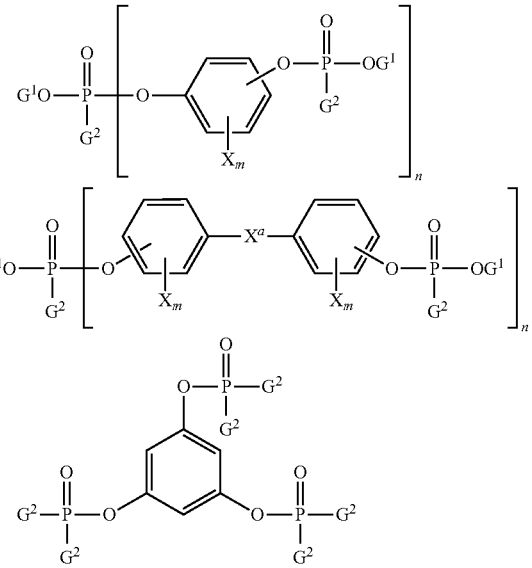

wherein each $G^1$ is independently a $C_{1-30}$ hydrocarbon; each $G^2$ is independently a $C_{1-30}$ hydrocarbon or $C_{1-30}$ hydrocarbonoxy; each X is independently a bromine or chlorine; m is 0 to 4, and n is 1 to 30. Di- or polyfunctional aromatic phosphorus-containing compounds include resorcinol tetraphenyl diphosphate (RDP), the bis(diphenyl) phosphate of hydroquinone and the bis(diphenyl) phosphate of bisphenol A, respectively, their oligomeric and polymeric counterparts, and the like.

Flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of 5 to 30 parts by weight, more specifically 7 to 15 parts by weight, based on 100 parts by weight of polycarbonate and impact modifier.

Halogenated materials can also be used as flame retardants, for example halogenated compounds and resins of formula (18)

(18)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (18) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl group such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of 0.1 to 10 parts by weight, more specifically 0.5 to 5 parts by weight, based on 100 parts by weight of polycarbonate and impact modifier.

The polycarbonate composition can be essentially free of chlorine and bromine Essentially free of chlorine and bromine refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the polycarbonate composition it is based on the total weight of the composition, excluding any filler.

Inorganic flame retardants can also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate (KSS), and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. The flame retardant can comprise p-toluenesulfonic acid sodium salt (NaTS). When present, inorganic flame retardant salts are generally present in amounts of 0.05 to 10 parts by weight, more specifically 0.1 to 5 parts by weight, based on 100 parts by weight of polycarbonate and impact modifier.

Another useful type of flame retardant is a polysiloxane-polycarbonate copolymer having polydiorganosiloxane blocks comprise repeating structural units of formula (19):

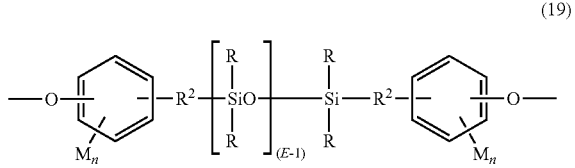

(19)

wherein each R is the same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. Combinations of the foregoing R groups can be used in the same copolymer. $R^2$ in formula (19) is a divalent $C_1$-$C_8$ aliphatic group. Each M in formula (19) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

E in formula (19) is selected so as to provide an effective level of flame retardance to the polycarbonate composition. The value of E will therefore vary depending on the type and relative amount of each component in the polycarbonate composition, including the type and amount of polycarbonate, impact modifier, polysiloxane-polycarbonate copolymer, and other flame retardants. Suitable values for E can be determined by one of ordinary skill in the art without undue experimentation using the guidelines taught herein. Generally, E has an average value of 2 to 1,000, specifically 10 to 100, more specifically 25 to 75. In an embodiment, E has an average value of 40 to 60, and in still another embodiment, E has an average value of 50. Where E is of a lower value, e.g., less than 40, it can be necessary to use a relatively larger amount of the polysiloxane-polycarbonate copolymer. Conversely, where E is of a higher value, e.g., greater than or equal to 40, it can be necessary to use a relatively smaller amount of the polysiloxane-polycarbonate copolymer.

In an embodiment, M is independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

The polysiloxane-polycarbonate copolymer can be manufactured by reaction of the corresponding dihydroxy polysiloxane with a carbonate source and a dihydroxy aromatic compound of formula (3), optionally in the presence of a phase transfer catalyst as described above. Conditions are similar to those useful in forming polycarbonates. Alternatively, the polysiloxane-polycarbonate copolymers can be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising 1 to 60 mole % of polydiorganosiloxane blocks relative to the moles of polycarbonate blocks, and more generally, 3 to 50 mole % of polydiorganosiloxane blocks relative to the moles of polycarbonate blocks. When present, the copolymers can be used in amounts of 5 to 50 parts by weight, more specifically 10 to 40 parts by weight, based on 100 parts by weight of polycarbonate and the impact modifier.

UV Stabilizer

Light stabilizers and/or ultraviolet light (UV) absorbing additives, also referred to as UV stabilizers, can also be used. Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYAS ORB* 1164); 2,2'-(1,4-phenylene)bis(4H-3,1-benzoxazin-4-one) (CYASORB* UV-3638); poly[(6-morpholino-s-triazine-2,4-diyl)[2,2,6,6-tetramethyl-4-piperidyl) imino]-hexamethylene[(2,2,6,6-tetramethyl-4-piperidyl)imino], 2-hydroxy-4-octyloxybenzophenone (UVINUL*3008), 6-tert-butyl-2-(5-chloro-2H-benzotriazole-2-yl)-4-methylphenyl (UVINUL*3026), 2,4-di-tert-butyl-6-(5-chloro-2H-benzotriazole-2-yl)-phenol (UVINUL*3027), 2-(2H-benzotriazole-2-yl)-4,6-di-tert-pentylphenol (UVINUL*3028), 2-(2H-benzotriazole-2-yl)-4-(1,1,3,3-tetramethylbutyl)-phenol (UVINUL*3029), 1,3-bis[(2' cyano-3',3'-diphenylacryloyl)oxy]-2,2-bis-{[(2'-cyano-3',3'-diphenylacryloyl)oxy]methyl}-propane (UVINUL*3030), 2-(2H-benzotriazole-2-yl)-4-methylphenol (UVINUL*3033), 2-(2H-benzotriazole-2-yl)-4,6-bis(1-methyl-1-phenyethyl)phenol (UVINUL*3034), ethyl-2-cyano-3,3-diphenylacrylate (UVINUL*3035), (2-ethylhexyl)-2-cyano-3,3-diphenylacrylate (UVINUL*3039), N,N'-bisformyl-N,N'-bis(2,2,6,6-tetramethyl-4-piperidinyl)hexamethylendiamine (UVINUL*4050H), bis-(2,2,6,6-tetramethyl-4-pipieridyl)-sebacate (UVINUL*4077H), bis-(1,2,2,6,6-pentamethyl-4-piperdiyl)-sebacate+methyl-(1,2,2,6,6-pentamethyl-4-piperidyl)-sebacate (UVINUL*4092H) 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene) bis(4H-3,1-benzoxazin-4-one); 1,3-bis [(2-cyano-3,3-diphenylacryloyl)oxy]-2,2-bis[[(2-cyano-3,3-diphenylacryloyl)oxy]methyl]propane; TINUVIN* 234; nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of polycarbonate and impact modifier. UV absorbers that can be particularly useful with the polycarbonate compositions disclosed herein include 2-(2H-benzotriazol-2-yl)-4-(1,1,3,3-tetramethylbutyl)-phenol (e.g., CYASORB* 5411 commercially available from Cytec Industries, Inc., Woodland Park, N.J.) and 2,2'-(1,4-phenylene)bis(4H-3,1-benzoxazin-4-one) (e.g., CYASORB* UV-3638, commercially available from Cytec Industries, Inc., Woodland Park, N.J.), and combinations comprising at least one of the foregoing. The UV stabilizers can be present in an amount of 0.01 wt % to 1 wt %, specifically, 0.1 wt % to 0.5 wt %, and more specifically 0.15 wt % to 0.4 wt %, based upon the total weight of the polycarbonate composition.

Additives

In addition to the polycarbonate, the polycarbonate composition can include various additives (such as impact modifiers, fillers, heat stabilizers, plasticizers, lubricants, mold release agents, anti-drip agents, antistatic agents, colorants, radiation stabilizers, and low gloss additives) ordinarily incorporated into polycarbonate compositions of this type, with the proviso that the additive(s) are selected so as to not significantly adversely affect the desired properties of the polycarbonate composition, in particular the reflectance values. Combinations of additives can be used. Such additives can be mixed at a suitable time during the mixing of the components for forming the composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Co-woven structures include glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants.

Heat stabilizer additives include organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. The heat stabilizer can be tris(2,4-di-t-butylphenyl) phosphate available as IRGAPHOS* 168. Heat stabilizers are generally used in amounts of 0.01 to 5 parts by weight, based on 100 parts by weight of polycarbonate and impact modifier.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents. The antistatic agent can be present in an amount of less than or equal to 3 wt %, specifically, greater than 0 and less than or equal to 3 wt %, more specifically, less than or equal to 1 wt %, even more specifically, less than or equal to 0.75 wt %, based upon a total weight of the polycarbonate composition. For example, the amount of antistatic agent can be 0.01 wt % to 2 wt %, specifically, 0.05 wt % to 1 wt %, based upon a total weight of the polycarbonate composition.

Polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT* 6321 (Sanyo) or PEBAX* MH1657 (Atofina), IRGASTAT* P18 and P22 (Ciba-Geigy). Other polymeric materials that can be used as antistatic agents are inherently conducting polymers such as polyaniline (commercially available as PANIPOL*EB from Panipol), polypyrrole and polythiophene (commercially available from Bayer), which retain some of their intrinsic conductivity after melt processing at elevated temperatures. In an embodiment, carbon fibers, carbon nanofibers, carbon nanotubes, carbon black, or a combination comprising at least one of the foregoing can be used in a polymeric resin containing chemical antistatic agents to render the composition electrostatically dissipative.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"", 5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. A TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for example, an aromatic polycarbonate or SAN to form an agglomerated material for use as an anti-drip agent. Either method can be used to produce an encapsulated fluoropolymer.

Radiation stabilizers can also be present, specifically gamma-radiation stabilizers. Gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl alcohol. 2-Methyl-2,4-pentanediol, polyethylene glycol, and polypropylene glycol are often used for gamma-radiation stabilization.

Polycarbonate Composition

In an embodiment, the polycarbonate composition comprises 80 to 93 wt % of the polycarbonate and 7 to 20 wt % of a reflective agent. In another embodiment, the polycarbonate composition comprises 85 to 87.5 wt % polycarbonate and 12.5 to 15 wt % of a reflective agent. In another embodiment, the polycarbonate composition comprises 69 to 93 wt % polycarbonate; 7 to 20 wt % of a reflective agent; 0 to 1 wt % of a UV stabilizer; and 0 to 10 wt % of a flame retardant. The composition can be free of metallization and relies only on the reflective agent to provide the high reflectivity. All of the foregoing wt % values are based on the combined weight of the composition.

The polycarbonate composition can be manufactured by various methods. For example, powdered polycarbonate, impact modifier, titanium dioxide, an optional flame retardant, an optional UV stabilizer and/or other optional components are first blended, optionally with fillers in a HENSCHEL-Mixer* high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Plaques formed from the polycarbonate composition can have a reflectance (also referred to as maximum reflectance) of greater than or equal to 95.0%, specifically, greater than or equal to 96.0%, more specifically, greater than or equal to 96.5%, more specifically, greater than or equal to 97.0%, yet more specifically, greater than or equal to 97.5%, and even greater than or equal to 98.0%, as determined by reflectance measurements using a Gretag Macbeth Coloreye spectrophotometer (D65 light source, 10 degree observer, UV included) made at a wavelength of 680 nm.

The polycarbonate composition can have a melt volume ratio (MVR) of greater than or equal to 5 g/10 minutes, more specifically greater than or equal to 7 g/10 minutes, measured at 250° C. under a load of 10 kg and/or 260° C. under a load of 2.16 kg and/or 300° C. under a load of 1.2 kg in accordance with ASTM D1238-04. The polycarbonate composition can have a melt volume ratio (MVR) of 5 to 50 g/10 minutes, more specifically 7 to 30 g/10 minutes, measured at 250° C. under a load of 10 kg and/or 260° C. under a load of 2.16 kg and/or 300° C. under a load of 1.2 kg in accordance with ASTM D1238-04.

The polycarbonate composition can have a probability of first time pass of greater than or equal to 85% and more specifically, greater than or equal to 90%.

In an embodiment, the polycarbonate composition can achieve a UL94 V0 rating at 1.5 mm.

The polycarbonate can have excellent color stability, i.e., a 3.2 mm plaque of the composition, exposed to a light emitting diode (LED) light in a light box with 6 LED lights (GE—Tetra LED System 5 Amp max output 20 watts) for 2,000 hours results in a color change of less than or equal to 0.5 Delta E units (DE), specifically, less than or equal to 0.25 DE. DE represents a change in the color parameters L* [difference between light (L*=100) and dark (L*=0) values], a* [difference between green (−a*) and red (+a*)], and b* [difference between yellow (+b*) and blue (−b*)] of a 2.54 millimeter (mm) color chip measured before and after exposure to the LED light system. The color shift can be bluer and the level of reflectance can improve.

Shaped, formed, or molded articles comprising the thermoplastic (e.g., polycarbonate) compositions are also provided. The compositions can be molded into useful shaped articles by a variety of means such as injection molding, extrusion, rotational molding, blow molding and thermoforming. Since the article can be reflective, the composition can be employed in articles where reflectivity is desirable. Optionally, the articles can be without metallization (e.g., without metallization on the reflective surface). Some possible articles include, a substrate, a window, or a housing. The article can be a reflector, e.g., a reflector for a switch (such as an illuminating push switch or optoelectronic switch), a display inner frame of a vending machine, a reflector in a back light display unit, a stroboscopic reflector, and the like. The articles can be used as components in lighting applications (indoor lighting, outdoor lighting, vehicle lighting, displays, and so forth), such as head lights, overhead lights, street lights, recessed lights, handheld lights (e.g., flashlights), front and/or rear lights for a vehicle, interior vehicle lights, and so forth. Articles comprising the compositions can be used in vehicular applications (for example in automobiles, water crafts, trains, and planes); building applications (for example in houses, apartments, office buildings, stores, and tunnels). In the lighting application the article can form any desired reflective surface, such as a reflector or housing for a light source (e.g., bulb, laser, or LED). For example, the compositions can be used for such application as the reflector in a troffer such as that illustrated in FIG. 1. For example, in a lighting application, an illumination device can comprise a light source, a reflector which is in optical communication with the light source when in use, wherein the reflector comprises the polycarbonate composition (and optionally, wherein the surface of the reflector in optical communication with the light source is free of metallization), and a power element for directing power from a power source to the light source. Optionally, the device can further comprise a heat sink for removing heat, e.g., heat generated by the light source.

The polycarbonate compositions are further illustrated by the following non-limiting examples.

EXAMPLES

In the examples, the level of reflectivity of the resin was measured using a Gretag Macbeth Coloreye spectrophotometer (D65 light source, 10 degree observer, UV included) at intervals of 10 nanometers (nm) from 360 to 750 nm, e.g., measured on a 3.2 mm thick plaque. Measurements were made at wavelength intervals of 10 nm from 360 to 750 nm. Reflectivity values at 680 nm were used to define maximum percent reflectivity for each material formulation.

Melt Volume Rate (MVR) was determined at 300° C. using a 1.2-kilogram weight, in accordance with ASTM D1238-04.

The color of the polycarbonate composition was measured according to the CIELAB color space. The CIELAB color space has three parameters: L*, a*, and b*. L* represents the lightness of the color, where L*=0 is black and L*=100 is white.

Flammability tests were performed following the procedure of Underwriter's Laboratory Bulletin 94 entitled "Tests for Flammability of Plastic Materials, UL94." According to this procedure, materials may be classified as HB, V0, V1, V2, 5VA and/or 5 VB on the basis of the test results obtained for five samples at the specified sample thicknesses. The samples are made according to the UL94 test procedure using standard ASTM molding criteria. The criteria for each of the flammability classifications tested are described below.

V0: In a sample placed so that its long axis is 180 degrees to the flame, the average period of flaming and/or smoldering after removing the igniting flame does not exceed five seconds (sec) and none of the vertically placed samples produces drips of burning particles that ignite absorbent cotton, and no specimen burns up to the holding clamp after flame or after glow. Five bar flame out time (FOT) is the sum of the flame out time for five bars, each lit twice for ten (10) seconds each, for a maximum flame out time of 50 seconds. FOT1 is the average flame out time after the first light. FOT2 is the average flame out time after the second light.

V1, V2, FOT: In a sample placed so that its long axis is 180 degrees to the flame, the average period of flaming and/or smoldering after removing the igniting flame does not exceed twenty-five seconds and, for a V1 rating, none of the vertically placed samples produces drips of burning particles that ignite absorbent cotton. The V2 standard is the same as V1, except that drips are permitted. Five bar flame out time (FOT) is the sum of the flame out time for five bars, each lit twice for ten (10) seconds each, for a maximum flame out time of 250 seconds.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$pFTP = (P_{t1>mbt, n=0} \times P_{t2>mbt, n=0} \times P_{total<=mbt} \times P_{drip, n=0})$$

where $P_{t1>mbt, n=0}$ is the probability that no first burn time exceeds a maximum burn time value, $P_{t2>mbt, n=0}$ is the probability that no second burn time exceeds a maximum burn time value, $P_{total<=mbt}$ is the probability that the sum of the burn times is less than or equal to a maximum total burn time value, and $P_{drip, n=0}$ is the probability that no specimen exhibits dripping during the flame test. First and second burn time refer to burn times after a first and second application of the flame, respectively.

The probability that no first burn time exceeds a maximum burn time value, $P_{t1>mbt, n=0}$, may be determined from the formula:

$$P_{t1>mbt, n=0} = (1 - P_{t1>mbt})^5$$

where $P_{t1>mbt}$ is the area under the log normal distribution curve for t1>mbt, and where the exponent "5" relates to the number of bars tested.

The probability that no second burn time exceeds a maximum burn time value may be determined from the formula:

$$P_{t2>mbt, n=0} = (1 - P_{t2>mbt})$$

where $P_{t2>mbt}$ is the area under the normal distribution curve for t2>mbt. As above, the mean and standard deviation of the burn time data set are used to calculate the normal distribution curve. For the UL-94 V0 rating, the maximum burn time is 10 seconds. For a V1 or V2 rating the maximum burn time is 30 seconds[5].

The probability $P_{drip, n=0}$ that no specimen exhibits dripping during the flame test is an attribute function, estimated by:

$$(1 - P_{drip})^5$$

where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V1 or V2 rating, the maximum total burn time is 250 seconds.

Desirably, p(FTP) is as close to 1 as possible, for example, greater than or equal to ($\geq$) 0.7, optionally greater than or equal to 0.85, optionally greater than or equal to 0.9 or, more specifically, greater than or equal to 0.95, for maximum flame-retardant performance in UL testing. The p(FTP) $\geq$0.7, and specifically, p(FTP) $\geq$0.85, is a more stringent standard than merely specifying compliance with the referenced V0 or V1 test.

The following components as used in the examples are described in Table 1.

TABLE 1

| Acronym | Component** | Source |
| --- | --- | --- |
| Hi Flow PC | BPA-Polycarbonate having a weight average MW of 21,900 daltons | SABIC's Innovative Plastics business |
| 100 Grade PC | BPA-Polycarbonate having a weight average MW of 29,900 daltons | SABIC's Innovative Plastics business |
| PC-Br | Tetra bromo BPA-Polycarbonate copolymer having a weight average MW of 23,600 daltons and 26.5% tetra bromo BPA | SABIC's Innovative Plastics business |
| $TiO_2$ | Titanium dioxide coated with organic polysiloxane coating | Kronos |
| UV1 | UV stabilizer, 2-(2H-benzotriazol-2-yl)-4-(1,1,3,3-tetramethylbutyl)-phenol | Cytec Industrial Corp. |

TABLE 1-continued

| Acronym | Component** | Source |
|---|---|---|
| UV2 | UV stabilizer 2-(2 hydroxy-3,5 dicumyl) benzotriazole | BASF |
| UV3 | UV stabilizer, 2,2'-(1,4-phenylene)bis(4H-3,1-benzoxazin-4-one) | Cytec Industrial Corp. |
| Irgafos 168 | Heat stabilizer, tris(2,4-di-t-butylphenyl) phosphate | BASF/Ciba Specialty Chemicals |
| KSS | Potassium diphenylsulfone sulfonate | SLOSS INDUSTRIES CORPORATION |
| Rimar salt | Potassium perfluorobutane sulfonate | LANXESS |
| NaTS | p-toluenesulfonic acid sodium salt | Arichem |
| TSAN | SAN encapsulated PTFE | SABIC's Innovative Plastics business |
| PETS | Pentaerythritol tetrastearate | Lonza |
| Silicone 1 | Octaphenylcyclotetrasiloxane | Momentive |
| Silicone 2 | Polymethylphenylsiloxane | Momentive |

\* as determined by gel permeation chromatography using polycarbonate standards
\*\*wt % are based upon the total weight of the component

Example 1

Reflectivity of LEXAN*

Figure 2:
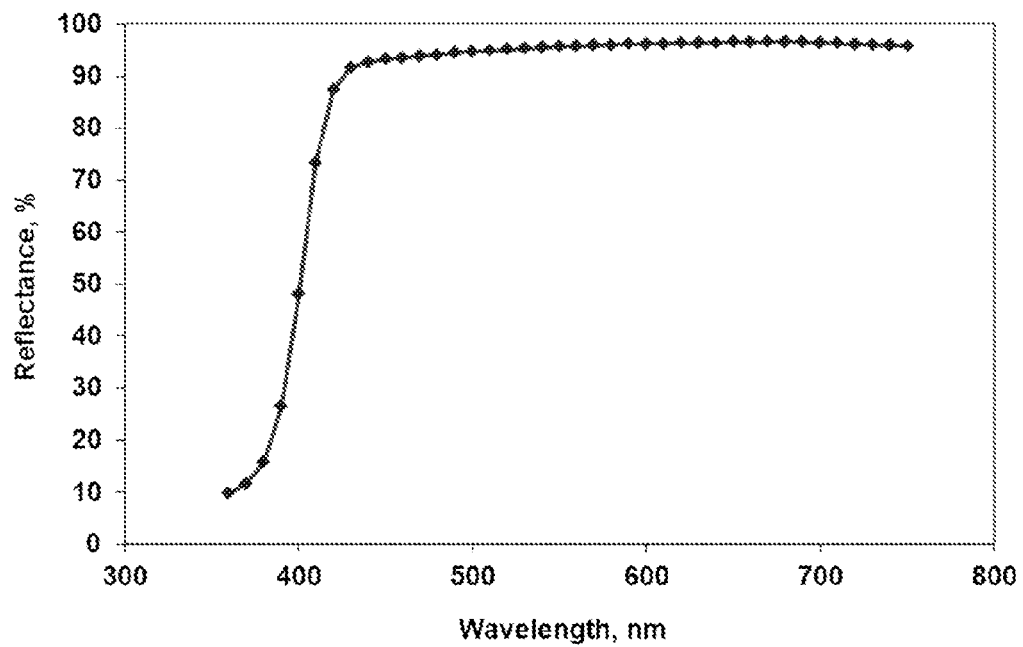
FIG. 2 is a graphical illustration of the reflectivity of Example 1 versus wavelength.

The reflectivity of polycarbonate comprising 15 wt % titanium dioxide, based upon the total weight of the polycarbonate composition (e.g., including the polycarbonate and the titanium dioxide), Sample B, was measured. The reflectivity data versus wavelength is illustrated in FIG. 2. The average reflectivity over the wavelengths of 430 nm to 700 nm is 95.1% and the maximum reflectivity measured at 680 nm is 96.3%.

Example 2

Compositions of Varying Additive Level

To polycarbonate powder produced by bisphenol A and phosgene by interfacial condensation polymerization, various additives shown in Table 2 were added in respective amounts and blended by a blender and melt-kneaded by use of a vented twin-screw extruder to obtain pellets. After the obtained pellets were dried by a hot air circulation type dryer at 120° C. for 6 hours, test pieces in the form of smooth, flat plates having a length of 75 mm, a width of 50 mm, and a thickness of 25 mm were molded using an injection molding machine at a cylinder temperature of 270° C. to 290° C., a mold temperature of 80° C. to 90° C., and an injection rate of 150 mm/sec.

The evaluation of the various samples for melt flow (MF) and their respective color properties is shown in Table 2, where DE is the color shift based on comparison to Sample A and at a thickness of 3.2 mm. The reflectance is reported in Table 2 as the maximum reflectance recorded (Ref-Max).

TABLE 2

| | PC (wt %) | | | | | | | | | | |
|---|---|---|---|---|---|---|---|---|---|---|---|
| Sample | Hi Flow | 100 Grade | TiO$_2$ (wt %)* | UV type | UV (wt %)* | MF (g/10 min) | L | a* | b* | DE | Ref-Max (%) |
| A | 0 | 100 | 10 | — | — | 9.5 | 98.12 | −0.50 | 2.63 | — | 96.53 |
| B | 0 | 100 | 15 | — | — | 9.35 | 98.22 | −0.51 | 2.45 | 0.21 | 96.66 |
| C | 0 | 100 | 10 | UV1 | 0.4 | 10.4 | 98.24 | −0.65 | 3.12 | 0.53 | 96.92 |
| D | 0 | 100 | 15 | UV1 | 0.4 | 10.8 | 98.30 | −0.63 | 2.94 | 0.38 | 97.00 |
| E | 0 | 100 | 10 | UV1 | 0.2 | 9.88 | 98.22 | −0.59 | 2.92 | 0.32 | 96.84 |
| F | 45 | 55 | 12.5 | UV1 | 0.2 | 15.1 | 98.41 | −0.62 | 2.67 | 0.32 | 97.11 |
| G | 0 | 100 | 7.5 | — | — | 8.76 | 98.09 | −0.49 | 2.61 | 0.03 | 96.45 |
| H | 0 | 100 | 7.5 | UV1 | 0.4 | 10.5 | 98.12 | −0.62 | 3.07 | 0.46 | 96.60 |
| I | 80 | 20 | 10 | — | — | 22.1 | 98.33 | −0.57 | 2.18 | 0.50 | 96.68 |
| J | 80 | 20 | 15 | — | — | 22.4 | 98.43 | −0.58 | 2.12 | 0.60 | 96.86 |
| K | 80 | 20 | 10 | UV1 | 0.4 | 24.3 | 98.38 | −0.66 | 2.48 | 0.34 | 96.86 |
| L | 80 | 20 | 15 | UV1 | 0.4 | 25.7 | 98.52 | −0.64 | 2.38 | 0.50 | 97.17 |
| M | 80 | 20 | 10 | UV1 | 0.2 | 23.9 | 98.40 | −0.61 | 2.32 | 0.43 | 96.81 |
| N | 80 | 20 | 7.5 | — | — | 21.9 | 98.34 | −0.56 | 2.23 | 0.46 | 96.75 |
| O | 80 | 20 | 7.5 | UV1 | 0.4 | 25.6 | 98.23 | −0.65 | 2.56 | 0.20 | 96.52 |
| P | 0 | 100 | 12.5 | UV2 | 0.2 | 9.99 | 98.37 | −0.57 | 2.25 | 0.46 | 96.78 |
| Q | 80 | 20 | 12.5 | UV2 | 0.2 | 24.4 | 98.44 | −0.64 | 2.48 | 0.38 | 97.02 |
| R | 0 | 100 | 15 | UV2 | 0.4 | 12.8 | 98.21 | −0.74 | 3.30 | 0.72 | 96.81 |
| S | 80 | 20 | 15 | UV2 | 0.4 | 30.5 | 98.23 | −0.80 | 3.19 | 0.65 | 96.68 |
| T | 0 | 100 | 12.5 | UV3 | 0.2 | 9.19 | 98.37 | −0.56 | 2.47 | 0.30 | 96.98 |
| U | 80 | 20 | 12.5 | UV3 | 0.2 | 24 | 98.45 | −0.63 | 2.69 | 0.36 | 97.25 |
| V | 0 | 100 | 15 | UV3 | 0.4 | 9.89 | 98.37 | −0.58 | 2.60 | 0.26 | 97.03 |
| W | 80 | 20 | 15 | UV3 | 0.4 | 24.5 | 98.47 | −0.64 | 2.69 | 0.38 | 97.28 |
| X | 0 | 100 | 20 | — | — | 9.4 | 97.89 | −0.55 | 2.19 | 0.50 | 95.53 |

*wt % is based upon the total weight of the composition.

Table 2 shows that the color of the samples was very consistent with minimal color shift (DE less than 1) for all samples. Table 2 also shows that higher levels of UV stabilizer resulted in the largest color shift, but was still able to maintain a color shift of less than 1.

Figure 3:
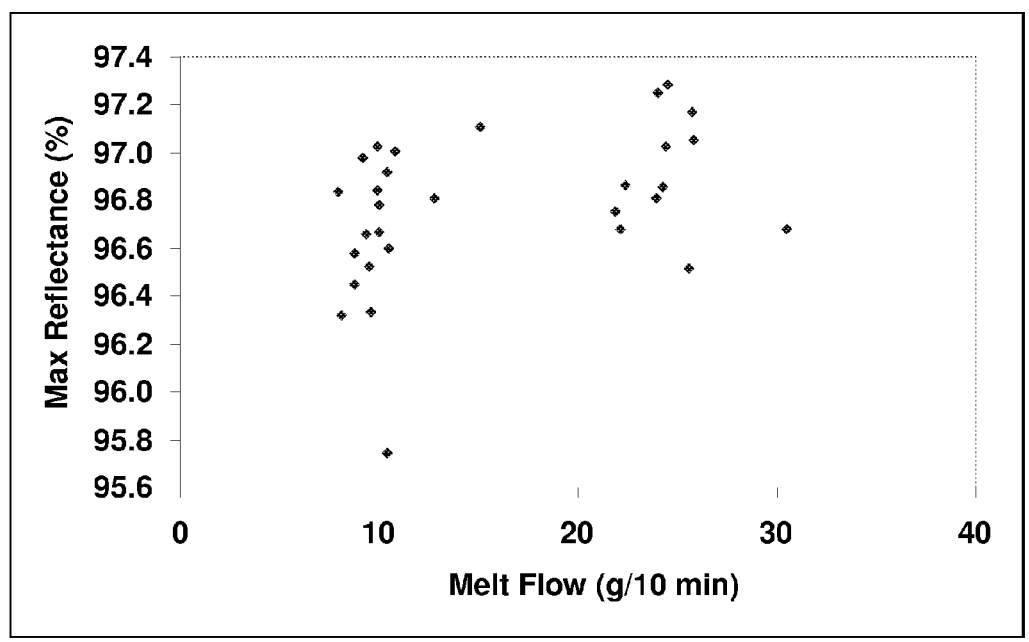
FIG. 3 is a graphical illustration of the maximum reflectivity versus melt flow of the compositions of Example 2.
Figure 4:
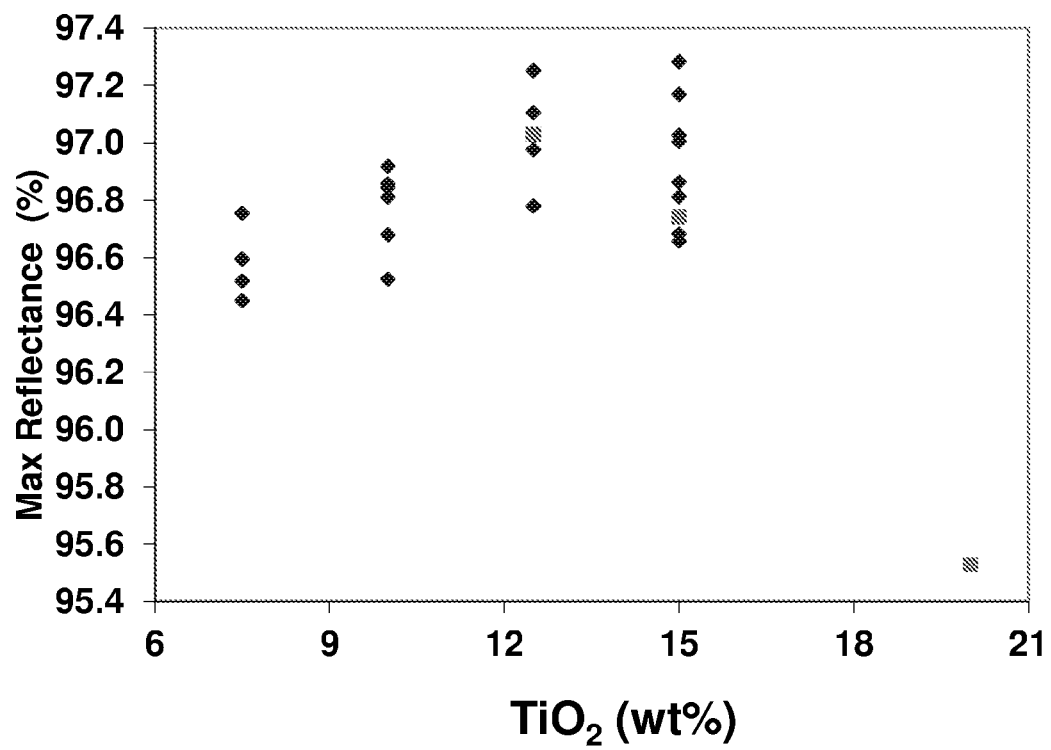
FIG. 4 is a graphical illustration of the maximum reflectivity versus titanium dioxide concentration of the compositions of Example 2.
Figure 5:
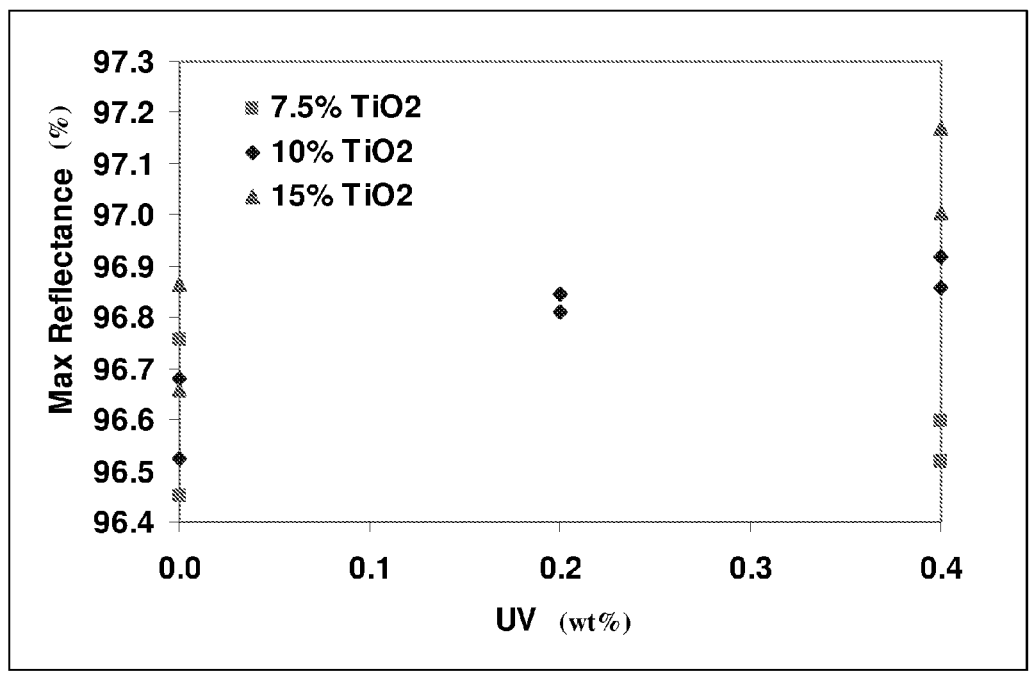
FIG. 5 is a graphical illustration of the maximum reflectivity versus UV stabilizer UV1 concentration of the compositions of Example 2.

In order to further illustrate the results from Table 2, the maximum reflectance versus melt flow, titanium dioxide concentration, and UV stabilizer UV 1 concentration was plotted in FIGS. 3, 4, and 5, respectively. It is noted that the scatter in the data in FIGS. 3, 4, and 5, is due to variation in the other variables as indicated in Table 2, i.e. the concentration of titanium dioxide.

FIG. 3 indicates that increasing the melt flow of the resin results in an increase in reflectivity.

FIG. 4 clearly shows a plateau maximum in reflectivity around 12.5 to 15% titanium dioxide, where the reflectivity is shown to decrease at around 20% titanium dioxide. This result is surprising as one would have expected that higher levels of titanium dioxide would result in higher reflectivity. In order to determine whether the increased level of titanium dioxide may be causing degradation of the polycarbonate resulting in lower reflectance, GPC tests and SEM imaging experiments were performed. The GPC results showed no change in molecular weight between samples containing 10 wt %, 15 wt %, and 20 wt % $TiO_2$, where the GPC showed all samples to have a weight average molecular weight (Mw) of approximately 26,000 g/mol, a number average molecular weight (Mn) of approximately 11,000 g/mol, and a polydispersity (PDI) of approximately 2.33. It is therefore believed that polycarbonate degradation is not the cause of the reduced reflectance at 20% $TiO_2$.

SEM images of the samples containing 10 wt %, 15 wt %, and 20 wt % $TiO_2$ were taken both on the sample surface of the prepared sample and on a surface made available from within the sample by cutting the sample into two sections. Images of the surfaces from within the polymer samples showed that the level of dispersion was identical within the molded part for all of the samples containing 10 wt %, 15 wt %, and 20 wt % $TiO_2$. However, surface images of the prepared samples showed that as the level of $TiO_2$ in the composition increased, both the amount of $TiO_2$ on the surface increased and the level of $TiO_2$ clustering. This surface effect could explain the reduction in reflectance at higher levels of $TiO_2$.

FIG. 5 indicates an increase in reflectivity when UV stabilizer is added, but it appears to have a synergistic relationship to the type of UV stabilizer and the amount of titanium dioxide in the formulations. FIG. 5 shows that as the amount of titanium dioxide increases, the effect of UV stabilizer becomes more pronounced. For example, for Samples B and L that comprise 15 wt % titanium dioxide, adding 0.4% UV1 increased the reflectivity by 0.35% from 96.66 to 97.17%, respectively. These results are surprising as one skilled in the art would have expected that the addition of UV stabilizer would have reduced the reflectance due to the absorbent nature of these additives.

Example 3

Color Stability with Exposure to LED Light

Polycarbonate samples comprising the standard PC and 12.5% titanium dioxide with a predicted melt flow of 7 were placed over an LED light in a light box with 6 LED lights (GE—Tetra LED System 5 Amp max output 20 watts) for 2000 hours. The average color change was only 0.15 DE with a shift bluer and the level of reflectance was slightly improved with an average increase of 0.2%. The increase in reflectance was most likely due to the slight reduction in yellowness of the sample.

Examples 4-28

Flame Retardance

The evaluation of the various samples for flame retardance is shown in Tables 3-4, where the amounts are based upon 100 parts by weight of polycarbonate and titanium dioxide.

TABLE 3

| | Example | | | | | | | |
|---|---|---|---|---|---|---|---|---|
| | 4 | 5 | 6 | 7 | 8 | 9 | 10 | 11 |
| Hi Flow PC | 28.3 | 28.3 | 28.3 | 28.3 | 58.2 | 58.2 | 80.8 | 80.8 |
| 100 Grade PC | 56.7 | 56.7 | 56.7 | 56.7 | 26.8 | 26.8 | 4.2 | 4.2 |
| $TiO_2$ | 15 | 15 | 15 | 15 | 15 | 15 | 15 | 15 |
| Irgafos 168 | 0.06 | 0.06 | 0.06 | 0.06 | 0.06 | 0.06 | 0.06 | 0.06 |
| TSAN | 0.5 | 0.5 | 0.5 | 0.5 | 0.5 | 0.5 | 0.5 | 0.5 |
| PETS | 0.2 | 0.2 | 0.2 | 0.2 | 0.2 | 0.2 | 0.2 | 0.2 |
| KSS | 0.3 | | | | 0.3 | | 0.3 | |
| Rimar salt | | 0.1 | 0.04 | | | 0.1 | | 0.1 |
| NaTS | | | 0.06 | 0.1 | | | | |
| Total | 101.06 | 100.86 | 100.86 | 100.86 | 101.06 | 100.86 | 101.06 | 100.86 |
| Flow | | | | | | | | |
| MVR, 6 min, 1.2 kg (g/10 min) | 7.19 | 8.52 | 8.85 | 10.4 | 11.4 | 12.4 | 16 | 16.9 |
| Flame Performance | | | | | | | | |
| UL94 at 1.5 mm, at 48 h, 23° C., | V0 | V0 | V1 | V1 | V0 | V0 | V0 | V0 |
| V0 p(FTP) | 0.95 | 0.55 | 0.62 | 0.35 | 0.86 | 0.6 | 1 | 0.72 |
| UL94 at 1.5 mm at 168 h, 70° C. | V0 | V0 | V0 | V0 | V0 | V0 | V0 | V0 |
| V0 p(FTP) | 0.92 | 1 | 0.95 | 0.94 | 1 | 0.99 | 1 | 1 |

Table 3 shows that all samples achieved a UL94 V0 rating at 1.5 mm after 168 hours. The flame retardants therefore act to improve the flame retardant properties of the compositions as compared to polycarbonates such as the polycarbonate of Sample B in Table 2 that does not comprise a flame retardant and is only able to achieve a UL94 V2 rating. The KSS formulations have p(FTP) values at 48 hours of 86 to 100%. When Rimar salt was used, the p(FTP) values dropped to 55 to 72% and adding NATS further decreased the p(FTP) to around 35%.

TABLE 4

| | Example | | | | | | | | |
|---|---|---|---|---|---|---|---|---|---|
| | 12 | 13 | 14 | 15 | 16 | 17 | 18 | 19 | 20 |
| Hi Flow PC | 39.5 | 70 | 86.5 | 39.5 | 70 | 83.5 | 39.5 | 70 | 86.5 |
| 100 Grade PC | 47 | 16.5 | | 44 | 13.5 | | 47 | 16.5 | |
| PC-Br | | | | 3 | 3 | 3 | | | |
| $TiO_2$ | 12.5 | 12.5 | 12.5 | 12.5 | 12.5 | 12.5 | 12.5 | 12.5 | 12.5 |
| Irgafos 168 | 0.06 | 0.06 | 0.06 | 0.06 | 0.06 | 0.06 | 0.06 | 0.06 | 0.06 |
| TSAN | 0.5 | 0.5 | 0.5 | 0.5 | 0.5 | 0.5 | 0.5 | 0.5 | 0.5 |
| PETS | 0.2 | 0.2 | 0.2 | 0.2 | 0.2 | 0.2 | 0.2 | 0.2 | 0.2 |
| KSS | 0.3 | 0.3 | 0.3 | 0.3 | 0.3 | 0.3 | 0.3 | 0.3 | 0.3 |
| UV1 | 0.3 | 0.3 | 0.3 | 0.3 | 0.3 | 0.3 | 0.3 | 0.3 | 0.3 |
| Silicone 1 | | | | | | | 0.1 | 0.1 | 0.1 |
| Silicone 2 | | | | | | | 0.4 | 0.4 | 0.4 |
| Total | 100.36 | 100.36 | 100.36 | 100.36 | 100.36 | 100.36 | 100.36 | 100.36 | 100.36 |
| | | | | Flow | | | | | |
| MVR, 6 min, 1.2 kg (g/10 min) | 8.2 | 12.2 | 15.5 | 7.2 | 13.2 | 15.8 | 10.9 | 16.8 | 20.6 |
| | | | | Flame Performance | | | | | |
| UL94 at 3.0 mm, at 48 h, 23° C., | 5VA | 5VA | 5VA | 5VA | 5VA | 5VA | 5VA | 5VA | 5VA |
| Avg after flame time (s) | 9.9 | 6.3 | 3.5 | 1.6 | 2.2 | 1.5 | 8.0 | 5.2 | 7.3 |
| UL94 at 3.0 mm, at 168 h, 70° C. | 5VA | 5VA | 5VA | 5VA | 5VA | 5VA | 5VA | 5VA | 5VA |
| Avg afterflame time (s) | 1.94 | 4.22 | 4.32 | 2.82 | 2.06 | 3.24 | 10.9 | 7.52 | 3.3 |
| [1]UL94 at 1.5 mm, at 48 h, 23° C., | V0 | V0 | V0 | V0 | V0 | V0 | V0 | V0 | V0 |
| V0 p(FTP) | 1 | 1 | 1 | 1 | 1 | 1 | 0.96 | 0.97 | 0.99 |
| [1]UL94 at 1.5 mm at 168 h, 70° C. | V0 | V0 | V0 | V0 | V0 | V0 | V0 | V0 | V0 |
| V0 p(FTP) | 1 | 1 | 1 | 1 | 1 | 1 | 1 | 1 | 1 |

*The UL94 5VA tests consisted of both bar and plaque specimens, where the pass criteria for the bars was that there were no drips of any kind after a flame time of less than or equal to 60 seconds and the pass criteria for the plaques was no hole formation or drips of any kind. Therefore a 5VA rating was achieved by a composition if both the bar and plaque criteria at a given thickness were met.
[1]The UL94 results are predicted results based upon the results obtained from the p(FTP) testing.

Table 4 shows that all samples are expected to achieve a UL94 5VA rating at 3.0 mm after 168 hours at 70° C. and after 48 hours at 23° C.

While the disclosure has been described with reference to an exemplary embodiment, it will be understood by those skilled in the art that various changes can be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The endpoints of all ranges directed to the same component or property are inclusive of the endpoint and independently combinable. For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. "Combination" is inclusive of blends, mixtures, alloys, reaction products, and the like. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Alkyl groups may be straight-chained or branched. Throughout the specification, reference is made to various bivalent groups. Such groups are the same as the monovalent groups that are similarly named, and are typically indicated with an "ene" suffix. For example, a $C_1$ to $C_6$ alkylene group is a bivalent linking group having the same structure as a $C_1$ to $C_6$ alkyl group.

Unless otherwise indicated, each of the foregoing groups can be unsubstituted or substituted, provided that the substitution does not significantly adversely affect synthesis, stability, or use of the compound. The term "substituted" as used herein means that any one or more hydrogens on the designated atom or group are replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

In an embodiment, a polycarbonate composition comprises: polycarbonate; 7 wt % to 20 wt % titanium dioxide, based upon a total weight of the polycarbonate composition; an optional flame retardant; and an optional UV stabilizer. A plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm.

In an embodiment, a polycarbonate composition comprises: a polycarbonate; 7 to 20 wt % titanium dioxide; a flame retardant; and an optional UV stabilizer; wherein the polycarbonate composition has a maximum reflectance of greater than or equal to 95%. The melt volume rate as determined at 300° C. using a 1.2 kilogram weight, in accordance with ASTM D1238-04 is from 5 to 30 grams per 10 minutes. When in the form of a 1.5 mm bar, the composition achieves a p(FTP) of greater than or equal to 85%. Optionally, when in the form of a 3.0 mm plaque, the composition is able to achieve a UL94 5VA rating after 168 hours at 70° C. and after 48 hours at 23° C.

In an embodiment, a method of making a polycarbonate composition comprises: combining polycarbonate with 7 wt % to 20 wt % titanium dioxide to form a polycarbonate composition, wherein the weight percentage is based upon a total weight of the polycarbonate composition; and pelletizing the composition to form pellets. A molded plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm. Optionally, the pellets can be injection molded to form an article, e.g., an article suitable for use as a reflector.

In various embodiments, (i) the polycarbonate composition has a melt volume rate as determined at 300° C. using a 1.2 kilogram weight, in accordance with ASTM D1238-04 of 5 to 30 grams per 10 minutes; and/or (ii) when in the form of a 1.5 mm plaque, the composition achieves a p(FTP) of greater than or equal to 85%; and/or (iii) the polycarbonate composition has a melt volume rate as determined at 300° C. using a 1.2-kilogram weight, in accordance with ASTM D1238-04 of 5 to 50 grams per 10 minutes; and/or (iv) a melt volume rate as determined at 300° C. using a 1.2-kilogram weight, in accordance with ASTM D1238-04 of 10 to 30 per 10 minutes; and/or (v) wherein the composition is able to achieve a UL94 5 VA rating at 3.0 mm after 168 hours at 70° C. and after 48 hours at 23° C.; and/or (vi) the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm; and/or (vii) wherein the maximum reflectance is greater than or equal to 96%; and/or (viii) wherein the maximum reflectance is greater than or equal to 97%; and/or (ix) wherein the maximum reflectance is greater than or equal to 97%; and/or (x) the composition has a melt volume rate as determined at 300° C. using a 1.2-kilogram weight, in accordance with ASTM D1238-04 of 5 to 50 grams per 10 minutes; and/or (xi) wherein the titanium dioxide is present in an amount of 10 wt % to 20 wt %; and/or (xii) wherein the titanium dioxide has an average particle size of 30 nm to 500 nm; and/or (xiii) wherein the titanium dioxide comprises coated titanium dioxide, where the titanium dioxide is coated with alumina and/or polysiloxane; and/or (xiv) wherein the flame retardant is present and is selected from potassium perfluorobutane sulfonate, KSS, NaTS, and a combination comprising at least one of the foregoing; and/or (xv) wherein the flame retardant is present and comprises KSS; and/or (xvi) wherein the UV stabilizer is present and is selected from 2-(2H-benzotriazol-2-yl)-4-(1,1,3,3-tetramethylbutyl)-phenol, 2,2'-(1,4-phenylene)bis(4H-3,1-benzoxazin-4-one), and combinations comprising at least one of the foregoing; and/or (xvi) and/or; and/or (xvii) wherein the composition further comprises an antistatic agent in an amount of greater than 0 to 3 wt %, based upon a total weight of the composition; and/or (xviii) wherein when exposed to an LED light in a light box with 6 LED lights (GE—Tetra LED System 5 Amp max output 20 watts) for 2,000 hours, a plaque formed from the composition has a color change of less than or equal to 0.5 DE; and/or (xix) wherein the composition is able to achieve a UL94 V0 rating at 1.5 mm.

Also included herein are articles made from any of the above compositions.

Also included herein is an illumination device, comprising: a reflective surface, wherein the reflective surface comprises the composition of any of the above compositions; means for illuminating; and means for providing power to the means for illuminating. Also included herein is a method of reflecting light comprising: illuminating a reflective surface with light from a light source, wherein the reflective surface comprises the polycarbonate composition of any of the above compositions. Also included herein is a method of reflecting light in a troffer comprising: illuminating a reflective surface of a troffer with light from a light source, wherein the reflective surface comprises the polycarbonate composition of any of the above compositions.

In the various embodiments of the article, (i) wherein the article is a reflector; and/or (ii) wherein the article is used in a vehicle; and/or (iii), wherein the article has a reflective surface, and wherein the reflective surface is free of metallization.

We claim:

1. An Illumination device, comprising:
    an LED;
    a reflective surface, wherein the reflective surface comprises a composition comprising polycarbonate;
        12.5 wt % to 15 wt % titanium dioxide, based upon a total weight of the polycarbonate composition;
        a flame retardant; and
        an optional UV stabilizer;
        wherein a plaque consisting essentially of the polycarbonate, the titanium dioxide, the flame retardant; and the optional UV stabilizer has a reflectance of greater than or equal to 96.5% as determined by reflectance measurements using a Gretag Macbeth Coloreye spectrophotometer (D65 light source, 10 degree observer, UV included) made at a wavelength of 680 nm;
        wherein a melt volume rate of the composition as determined at 300° C. using a 1.2 kilogram weight, in accordance with ASTM D1238-04 is from 5 to 30 grams per 10 minutes; wherein, when in the form of a 1.5 mm bar, the composition achieves a UL94 V0 probability of first time pass of greater than or equal to 85%; and wherein, when in the form of a 3.00 mm plaque, the composition is able to achieve a UL94 5VA rating after 168 hours at 70° C. and after 48 hours at 23° C.; and
    a lens in physical contact with the reflector.

2. The device of claim 1, wherein the maximum reflectance is greater than or equal to 97%.

3. The device of claim 1, wherein the maximum reflectance is greater than or equal to 97.5%.

4. The device of claim 1, wherein the composition has a melt volume rate as determined at 300 ° C. using a 1.2-kilogram weight, in accordance with ASTM D1238-04 of 5 to 50 grams per 10 minutes.

5. The device of claim 1, wherein the titanium dioxide has an average particle size of 30 nm to 500 nm.

6. The device of claim 1, wherein the titanium dioxide comprises coated titanium dioxide, where the titanium dioxide is coated with alumina and/or polysiloxane.

7. The device of claim 1, wherein the flame retardant is selected from potassium perfluorobutane sulfonate, potassium diphenylsulfone sulfonate, p-toluenesulfonic acid sodium salt, and a combination comprising at least one of the foregoing.

8. The device of claim 1, wherein the flame retardant comprises potassium diphenylsulfone sulfonate.

9. The device of claim 1, wherein the UV stabilizer is present and is selected from 2-(2H-benzotriazol-2-yl)-4-(1,1,3,3-tetramethylbutyl)-phenol, 2,2'-(1,4- phenylene)bis(4H-3,1-benzoxazin-4-one), and combinations comprising at least one of the foregoing.

10. The device of claim 1, wherein the composition further comprises an antistatic agent in an amount of greater than 0 to 3 wt %, based upon a total weight of the composition.

11. The device of claim 1, wherein when exposed to the LED light in a light box with 6 LED lights (GE—Tetra LED System 5 Amp max output 20 watts) for 2,000 hours, a 3.2 mm plaque formed from the composition has a color change of less than or equal to 0.5 DE.

12. The device of claim 1, wherein the composition is able to achieve a UL94 V0 rating at 1.5 mm.

13. The device of claim 1, wherein the reflective surface is free of metallization.

14. An illumination device, comprising:
    a reflective surface, wherein the reflective surface comprises a composition comprising polycarbonate;
        7 wt % to 15 wt % titanium dioxide, based upon a total weight of the polycarbonate composition;
        a flame retardant; and
        an optional UV stabilizer;
        wherein a plaque consisting essentially of the polycarbonate, the titanium dioxide, the flame retardant, and the optional UV stabilizer has a reflectance of greater than or equal to 96.5%, as determined by reflectance measurements using a Gretag Macbeth Coloreye spectrophotometer (D65 light source, 10 degree observer, UV included) made at a wavelength of 680 nm;
        wherein a melt volume rate of the composition as determined at 300° C. using a 1.2 kilogram weight, in accordance with ASTM D1238-04 is from 5 to 30 grams per 10 minutes; wherein, when in the form of a 1.5 mm bar, the composition achieves a UL94 V0 probability of first time pass of greater than or equal to 85%; and wherein, when in the form of a 3.00 mm plaque, the composition is able to achieve a UL94 5VA rating after 168 hours at 70° C. and after 48 hours at 23° C.;
    an LED; and
    means for providing power to the LED.

15. The device of claim 14, wherein the composition has a reflectance of greater than or equal to 97%, as determined by reflectance measurements using a Gretag Macbeth Coloreye spectrophotometer (D65 light source, 10 degree observer, UV included) made at a wavelength of 680 nm.

16. A method of reflecting light comprising:
    illuminating a reflective surface with light from an LED,
    wherein the reflective surface comprises a polycarbonate composition comprising polycarbonate;
        12.5 wt % to 15 wt % titanium dioxide, based upon a total weight of the polycarbonate composition;
        a flame retardant; and
        an optional UV stabilizer;
        wherein a plaque consisting essentially of the polycarbonate, the titanium dioxide, the flame retardant; and the optional UV stabilizer has a reflectance of greater than or equal to 96.5%, as determined by reflectance measurements using a Gretag Macbeth Coloreye spectrophotometer (D65 light source, 10 degree observer, UV included) made at a wavelength of 680 nm;
        wherein a melt volume rate of the composition as determined at 300° C. using a 1.2 kilogram weight, in accordance with ASTM D1238-04 is from 5 to 30 grams per 10 minutes; wherein, when in the form of a 1.5 mm bar, the composition achieves a UL94 V0 probability of first time pass of greater than or equal to 85%; and wherein, when in the form of a 3.00 mm plaque, the composition is able to achieve a UL94 5VA rating after 168 hours at 70° C. and after 48 hours at 23° C.

17. The method of claim 16, wherein the maximum reflectance is greater than or equal to 97%.

18. The method of claim 16, wherein the maximum reflectance is greater than or equal to 97.5%.

19. The method of claim 16, wherein the composition has a melt volume rate as determined at 300° C. using a 1.2-kilogram weight, in accordance with ASTM D1238-04 of 5 to 50 grams per 10 minutes.

20. The method of claim 16, wherein the titanium dioxide has an average particle size of 30 nm to 500 nm.

21. The method of claim 16, wherein the titanium dioxide comprises coated titanium dioxide, where the titanium dioxide is coated with alumina and/or polysiloxane.

22. The method of claim 16, wherein the flame retardant is selected from potassium perfluorobutane sulfonate, potassium diphenylsulfone sulfonate, p-toluenesulfonic acid sodium salt, and a combination comprising at least one of the foregoing.

23. The method of claim 22, wherein the flame retardant comprises potassium diphenylsulfone sulfonate.

24. The method of claim 16, wherein the UV stabilizer is present and wherein the UV stabilizer is selected from 2-(2H-benzotriazol-2-yl)-4-(1,1,3,3-tetramethylbutyl)-phenol, 2,2'-(1,4- phenylene)bis(4H-3,1-benzoxazin-4-one), and combinations comprising at least one of the foregoing.

25. The method of claim 16, further comprising an antistatic agent, wherein the antistatic agent is present in an amount of greater than 0 to 3 wt %, based upon a total weight of the composition.

26. The method of claim 16, wherein when exposed to light from the LED in a light box with 6 LED lights (GE—Tetra LED System 5 Amp max output 20 watts) for 2,000 hours, a plaque formed from the composition has a color change of less than or equal to 0.5 DE.

27. The method of claim 16, wherein an article formed from the polycarbonate composition is able to achieve a UL94 V0 rating at 1.5 mm.

28. An Illumination device, comprising:
   an LED;
   a reflective surface, wherein the reflective surface comprises a composition comprising polycarbonate;
   12.5 wt % to 15 wt % titanium dioxide, based upon a total weight of the polycarbonate composition;
   a flame retardant; and
   an optional UV stabilizer;
   wherein a plaque formed from the composition has a reflectance of greater than or equal to 96.5% as determined by reflectance measurements using a Gretag Macbeth Coloreye spectrophotometer (D65 light source, 10 degree observer, UV included) made at a wavelength of 680 nm and wherein the composition relies only on the titanium dioxide to provide the reflectance;
   wherein a melt volume rate of the composition as determined at 300° C. using a 1.2 kilogram weight, in accordance with ASTM D1238-04 is from 5 to 30 grams per 10 minutes; wherein, when in the form of a 1.5 mm bar, the composition achieves a UL94 V0 probability of first time pass of greater than or equal to 85%; and wherein, when in the form of a 3.00 mm plaque, the composition is able to achieve a UL94 5VA rating after 168 hours at 70° C. and after 48 hours at 23° C.; and
   a lens in physical contact with the reflector.

29. The method of claim 16, wherein the plaque relies only on the titanium dioxide to provide the reflectance.

30. The device of claim 28, wherein the flame retardant is selected from potassium perfluorobutane sulfonate, potassium diphenylsulfone sulfonate, p-toluenesulfonic acid sodium salt, and a combination comprising at least one of the foregoing.

* * * * *